Figures 1, 3:
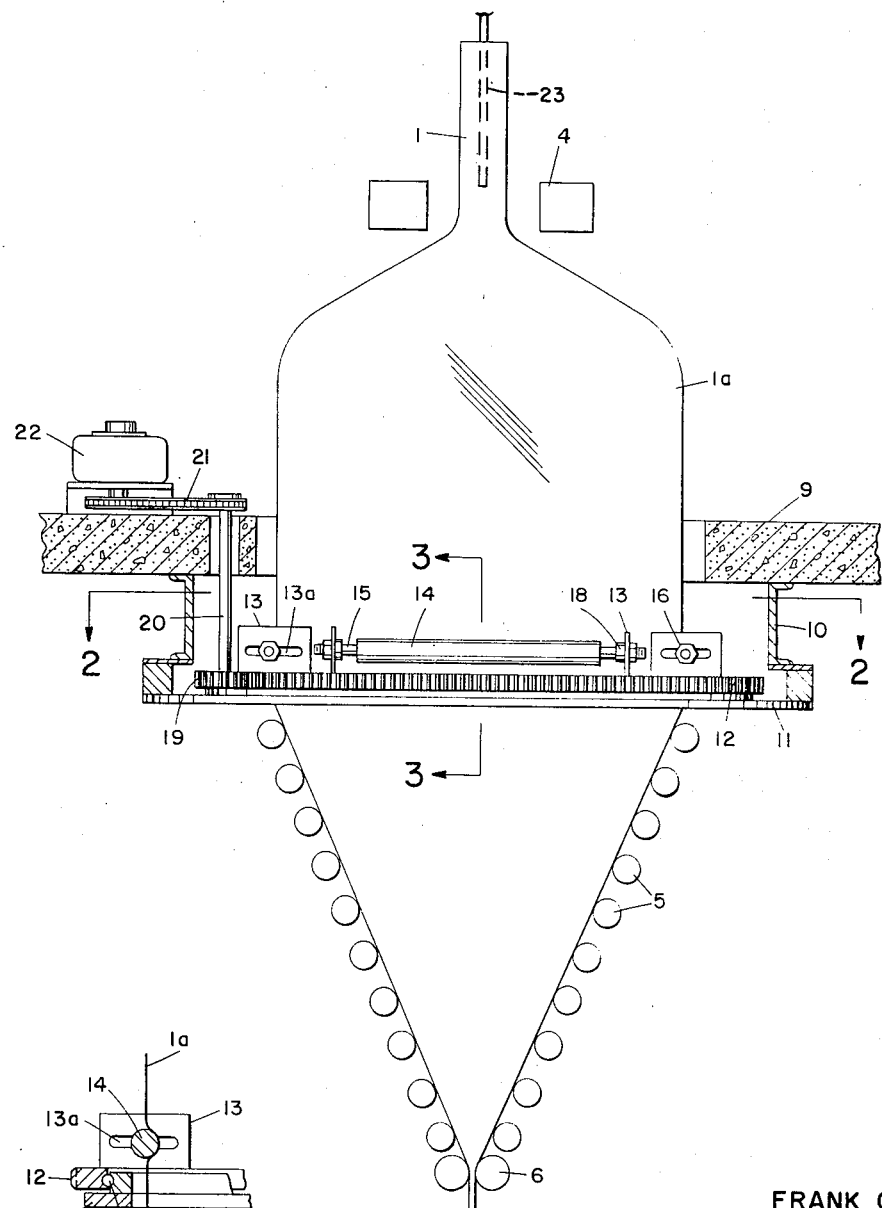

United States Patent
Pilcher

[15] 3,684,421
[45] Aug. 15, 1972

[54] APPARATUS FOR MANUFACTURE OF FILM
[72] Inventor: Frank C. Pilcher, Terre Haute, Ind.
[73] Assignee: Hercules Incorporated, Wilmington, Del.
[22] Filed: Sept. 29, 1970
[21] Appl. No.: 76,354

[52] U.S. Cl. .................425/327, 425/325, 425/392, 264/95
[51] Int. Cl. .............................................B29d 7/24
[58] Field of Search................18/14 S, 14 A; 264/95; 425/324, 325, 327, 392

[56] References Cited

UNITED STATES PATENTS

| | | |
|---|---|---|
| 3,576,935 | 4/1971 | Dyer et al. ..............425/327 X |
| 2,844,846 | 7/1958 | Kronholm...................18/14 S |
| 3,238,564 | 3/1966 | Fry.............................18/14 S |
| 3,492,693 | 2/1970 | Clarke et al. ...............18/14 S |
| 3,258,516 | 6/1966 | Ewing.....................18/14 S X |

Primary Examiner—J. Spencer Overholser
Assistant Examiner—Norman E. Lehrer
Attorney—Edwin H. Dafter, Jr.

[57] ABSTRACT

Improved apparatus for the manufacture of film by the tubular process which comprises means for grasping the inflated tube externally and oscillating it back and forth in a predetermined pattern to vary the path of any thickness variation in the film.

1 Claim, 3 Drawing Figures

FRANK C. PILCHER
INVENTOR

BY Edwin H. Duffey
ATTORNEY

PATENTED AUG 15 1972 3,684,421

SHEET 2 OF 2

FRANK C. PILCHER
INVENTOR

BY
ATTORNEY

APPARATUS FOR MANUFACTURE OF FILM

The present invention relates to apparatus for the manufacture of film. More particularly, it relates to apparatus for the manufacture of film from synthetic thermoplastic polymer by a tubular process.

It is well known to manufacture film from synthetic thermoplastic polymer by heating a tube of the polymer to a stretching temperature, inflating the tube by internal air pressure, collapsing the inflated tube, slitting it and winding it onto rolls. Film made by this process nearly always exhibits non-uniform wall thickness around its circumference. These wall thickness variations normally follow a straight line path through the process, and, consequently, the thicker areas in the film are continually wound upon themselves when the film is put onto rolls. This leads to the presence of high and low areas on the product rolls which result in unpleasing appearance and concentrated tensions which further reduce the uniformity of the film.

An objective of this invention is to provide apparatus for manufacturing film by the tubular process which continually changes the path of the thick and thin areas of the film so that they will not continually wind upon themselves when wound into a roll. In particular, the apparatus functions by grasping the inflated bubble externally and oscillating it back and forth in a predetermined pattern, thereby varying the path of any thickness variation in the film and thereby randomizing gauge variations over the width of the product roll. Accordingly, the apparatus comprises means for grasping the inflated bubble externally and oscillating it in a plane perpendicular to the bubble's longitudinal axis.

The apparatus will be described in detail in connection with the attached drawings in which FIG. 1 is a view of the apparatus in elevation.

Figure 2:
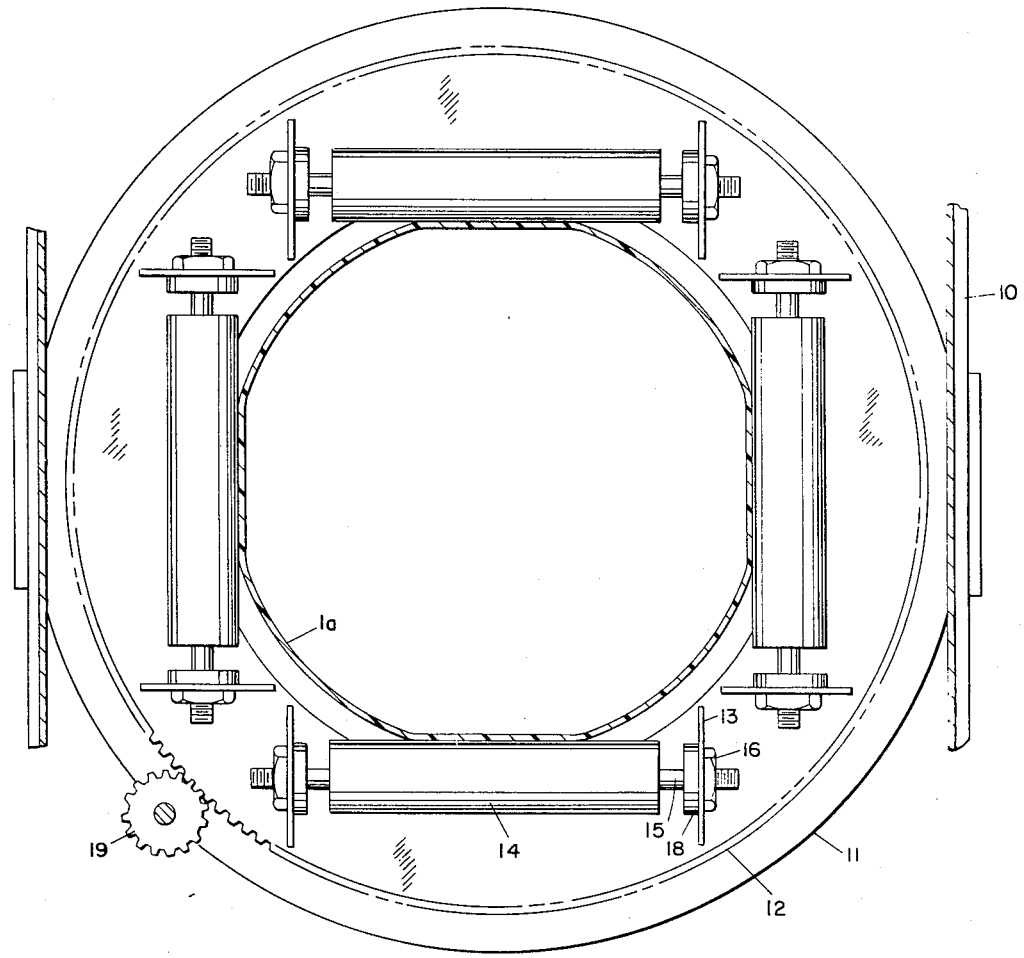

FIG. 2 is a sectional view of the apparatus taken along the line 2—2 of FIG. 1, and FIG. 3 is a sectional view taken along the line 3—3 of FIG. 1.

Referring specifically to the drawings, 1 represents a tube of synthetic thermoplastic polymer which may be, for example, polypropylene or polyester. The tube is heated to a stretching temperature by infrared heaters 4 and is thereby expanded into bubble 1a by air introduced through probe 23. The inflated bubble is collapsed by guide rollers 5 and hauled off by nip rollers 6 emerging from the nip rollers as flattened tubing 8. The flattened tubing is thereafter slit and wound onto rolls by conventional apparatus (not shown). Although the drawing depicts a downwardly moving bubble, it is to be understood that the direction of bubble movement is immaterial and that the apparatus can be applied equally well to processes in which the bubble moves upwardly or horizontally.

Referring back to the inflated bubble 1a, it is seen passing through an opening in concrete floor 9 to which there is affixed mounting brackets 10 which support a stationary circular platform 11 which surrounds the bubble at the approximate point of its maximum diameter. Mounted rotatably on stationary platform 11 via bearings 17 (see FIG. 3) is annular platform 12 having a serrated edge. Affixed to the upper surface of said rotatable annular platform 12 are four pairs of brackets 13, each having a pair of slots 13A. Each of brackets 13 supports in slots 13A the axles 15 of an idler roller 14 which is preferably covered with rubber or other material having a high coefficient of friction. Each roller 14 can be adjusted laterally in its corresponding slots 13A by adjustment of nuts 16 which, when tightened against flanges 17, secure the position of roller 14 against lateral movement. Means for oscillating platform 12 consists of gear 19, shaft 20, drive chain 21 and variable D.C. drive 22.

In operating the apparatus of the invention, as is best illustrated in FIG. 2, the idler rolls 14 are adjusted laterally to bear upon the outer surface of bubble 1a at 90° intervals, thereby grasping the surface of the moving bubble and causing slight flattening of the bubble at the point of contact. Because of the fact that idler rollers 14 are capable of rotation, downward movement of the bubble is not restricted. However, when the drive 22 is put into a programmed movement, this movement is translated by chain 21, shaft 20 and gear 19 to rotatable annular platform 12, causing it to oscillate via a predetermined movement. Movement of the platform in turn causes the bubble to oscillate as it is grasped by the rollers 14 which being affixed to the platform 12 oscillate therewith. Thus, the path of any given variation in the thickness of the bubble is deviated from a straight downward line so that when the film is ultimately wound these variations are distributed over the width of the product roll. In accordance with the invention, the rotatable annular platform can be driven in any of three basic modes of operation, these modes being (1) oscillation with angular velocity continually varying between zero and a preset maximum; (2) oscillation at a preset angular constant velocity; and (3) oscillation at continually varying angular velocity.

In a specific illustration of the invention there was employed in the manufacture of polypropylene film having a thickness of 0.00050 inch. An oscillated roll of film and a control roll of film were both produced on identical equipment and under identical conditions with the exception that the invention was utilized for production of the oscillated roll of film. In the apparatus employed, the idler rolls were covered with chlorosulfonated polyethylene (a synthetic rubber-like material) and the opposing roll faces were adjusted to 0.925 times the normal diameter of the inflated bubble. The apparatus was programmed to rotate the rotatable platform clockwise 0 to 0.40 to 0 r.p.m. and then counterclockwise from 0 to 0.40 to 0 r.p.m. over a 45-second cycle. Under these conditions the platform angle displacement was 16° and the tube film angle displacement was 7.8°. The utilization of the invention resulted in reducing the total thickness variation from 7 percent in the control roll to 33 in the oscillated roll.

What I claim and desire to protect by Letters Patent is:

1. In apparatus for making film from synthetic thermoplastic polymer including means for inflating a tube of said polymer to form an inflated bubble and means for collapsing said bubble, the improvement which comprises a rotatable platform surrounding said bubble at the point of its approximate maximum diameter, at least one set of four idler rollers supported on said platform in a plane perpendicular to the longitudinal axis of said bubble, said rollers being laterally adjustable independently of said collapsing means to grasp said bubble at a plurality of equally spaced points about its circumference prior to any contact between the bubble and said collapsing means and means for oscillating said platform angularly in a predetermined movement about the longitudinal axis of said bubble.

* * * * *

PO-1050
(5/69)

UNITED STATES PATENT OFFICE
CERTIFICATE OF CORRECTION

Patent No. 3,684,421          Dated August 15, 1972

Inventor(s) Frank C. Pilcher (Case No. 1)

It is certified that error appears in the above-identified patent and that said Letters Patent are hereby corrected as shown below:

Col. 2, line 53 of printed patent; page 5, line 12 of spec. -

"33"          should be       -- 3% --

Signed and sealed this 30th day of January 1973.

(SEAL)
Attest:

EDWARD M. FLETCHER, JR.          ROBERT GOTTSCHALK
Attesting Officer                 Commissioner of Patents